(12) United States Patent
Aronov et al.

(10) Patent No.: US 12,118,783 B2
(45) Date of Patent: Oct. 15, 2024

(54) SYSTEM AND METHOD FOR IDENTIFYING STRESSORS IN CROPS BASED ON CHARACTERISTICS OF SENSOR PLANTS

(71) Applicant: InnerPlant, Inc., San Francisco, CA (US)

(72) Inventors: Shely Aronov, San Francisco, CA (US); Roderick Kumimoto, San Francisco, CA (US); Ari Kornfeld, San Francisco, CA (US)

(73) Assignee: InnerPlant, Inc., Davis, CA (US)

( * ) Notice: Subject to any disclaimer, the term of this patent is extended or adjusted under 35 U.S.C. 154(b) by 392 days.

(21) Appl. No.: 17/704,652

(22) Filed: Mar. 25, 2022

(65) Prior Publication Data

US 2022/0309785 A1 Sep. 29, 2022

Related U.S. Application Data

(60) Provisional application No. 63/165,978, filed on Mar. 25, 2021.

(51) Int. Cl.
| | |
|---|---|
| G06V 20/10 | (2022.01) |
| G06T 7/00 | (2017.01) |
| G06V 20/00 | (2022.01) |
| H04W 4/02 | (2018.01) |
| H04W 4/029 | (2018.01) |
| G06Q 50/02 | (2012.01) |

(52) U.S. Cl.
CPC .......... *G06V 20/188* (2022.01); *G06T 7/0002* (2013.01); *G06V 20/38* (2022.01); *H04W 4/025* (2013.01); *H04W 4/029* (2018.02); *G06Q 50/02* (2013.01); *G06T 2207/10032* (2013.01); *G06T 2207/30188* (2013.01)

(58) Field of Classification Search
None
See application file for complete search history.

(56) References Cited

U.S. PATENT DOCUMENTS

| | | | |
|---|---|---|---|
| 2016/0302351 A1* | 10/2016 | Schildroth | ........... A01B 79/005 |
| 2018/0146612 A1* | 5/2018 | Sauder | ............. G06Q 10/06395 |
| 2020/0272971 A1* | 8/2020 | Ruff | ................. G06Q 10/06313 |
| 2020/0302338 A1* | 9/2020 | Carroll | .................... A01G 27/00 |
| 2021/0350128 A1* | 11/2021 | O'Brien | ............... G06V 20/188 |

* cited by examiner

*Primary Examiner* — Miya J Cato
(74) *Attorney, Agent, or Firm* — Finnegan, Henderson, Farabow, Garrett & Dunner, LLP (57) ABSTRACT

One variation of a method includes: in a feed of images recorded at a set frequency by an aerial sensor, detecting a signal generated by a sensor plant configured to generate optical signals indicating presence of a set of stressors; identifying a location of the sensor plant; identifying a user associated with a crop located proximal the location; and flagging the user for recruiting to join a sensor plant platform. The method further includes, during a trial period for the user: in response to detecting a pressure of a first stressor exceeding a threshold pressure at the sensor plant, notifying the user of the first pressure and a first action predicted to reduce pressures of the first stressor; and, in response to detecting a second pressure of a second stressor at the sensor plant, prompting the user to join the sensor plant platform to access information regarding the second stressor.

1 Claim, 2 Drawing Sheets

SYSTEM AND METHOD FOR IDENTIFYING STRESSORS IN CROPS BASED ON CHARACTERISTICS OF SENSOR PLANTS

CROSS-REFERENCE TO RELATED APPLICATIONS

This application claims the benefit of U.S. Provisional Application No. 63/165,978, filed on 25 Mar. 2021, which is incorporated in its entirety by this reference.

TECHNICAL FIELD

This invention relates generally to the field of agriculture and more specifically to a new and useful method for identifying stressors in crops based on characteristics of sensor plants in the field of agriculture.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1A:
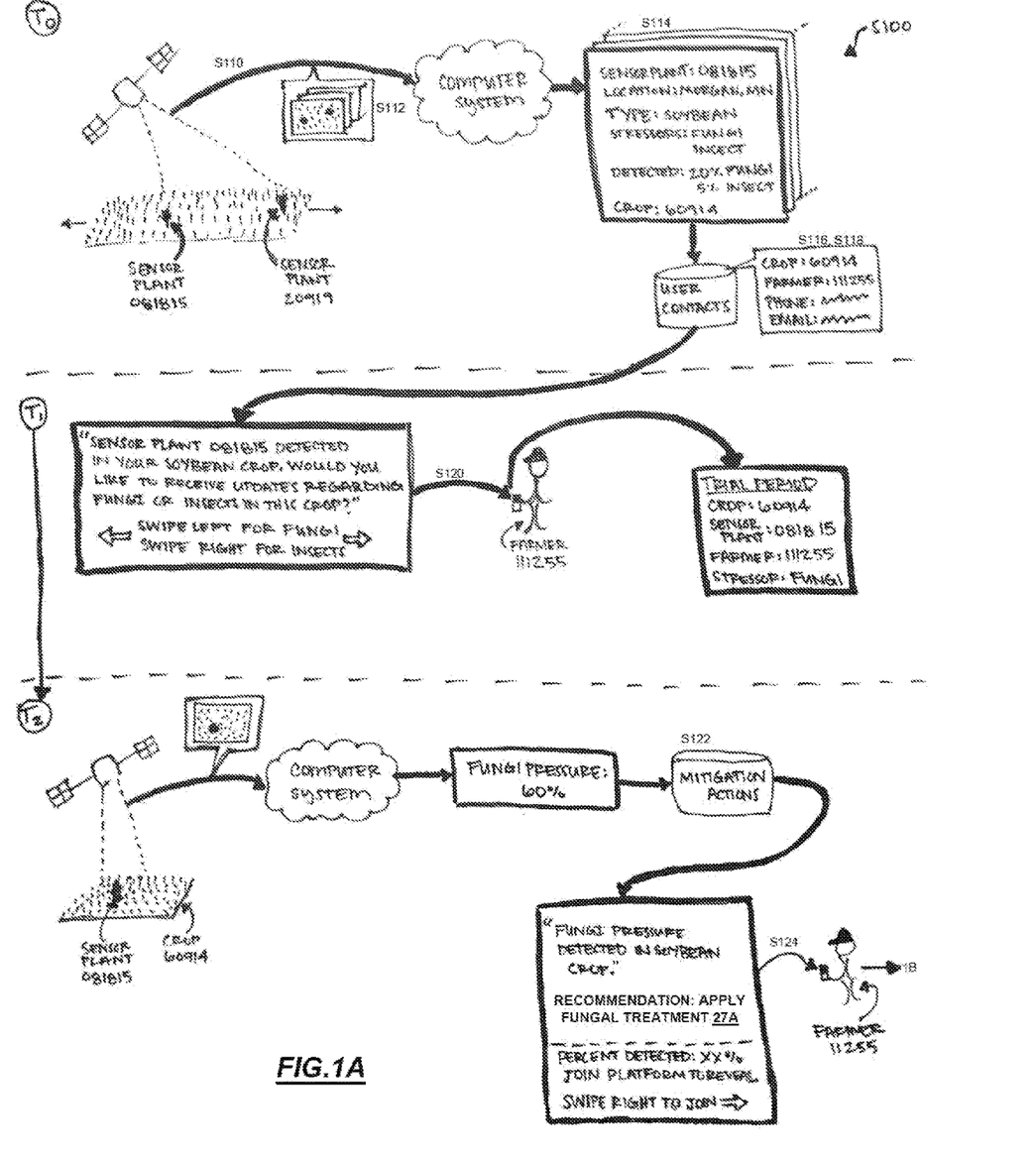
FIGS. 1A and 1B are flowchart representations of a method.
Figure 1B:
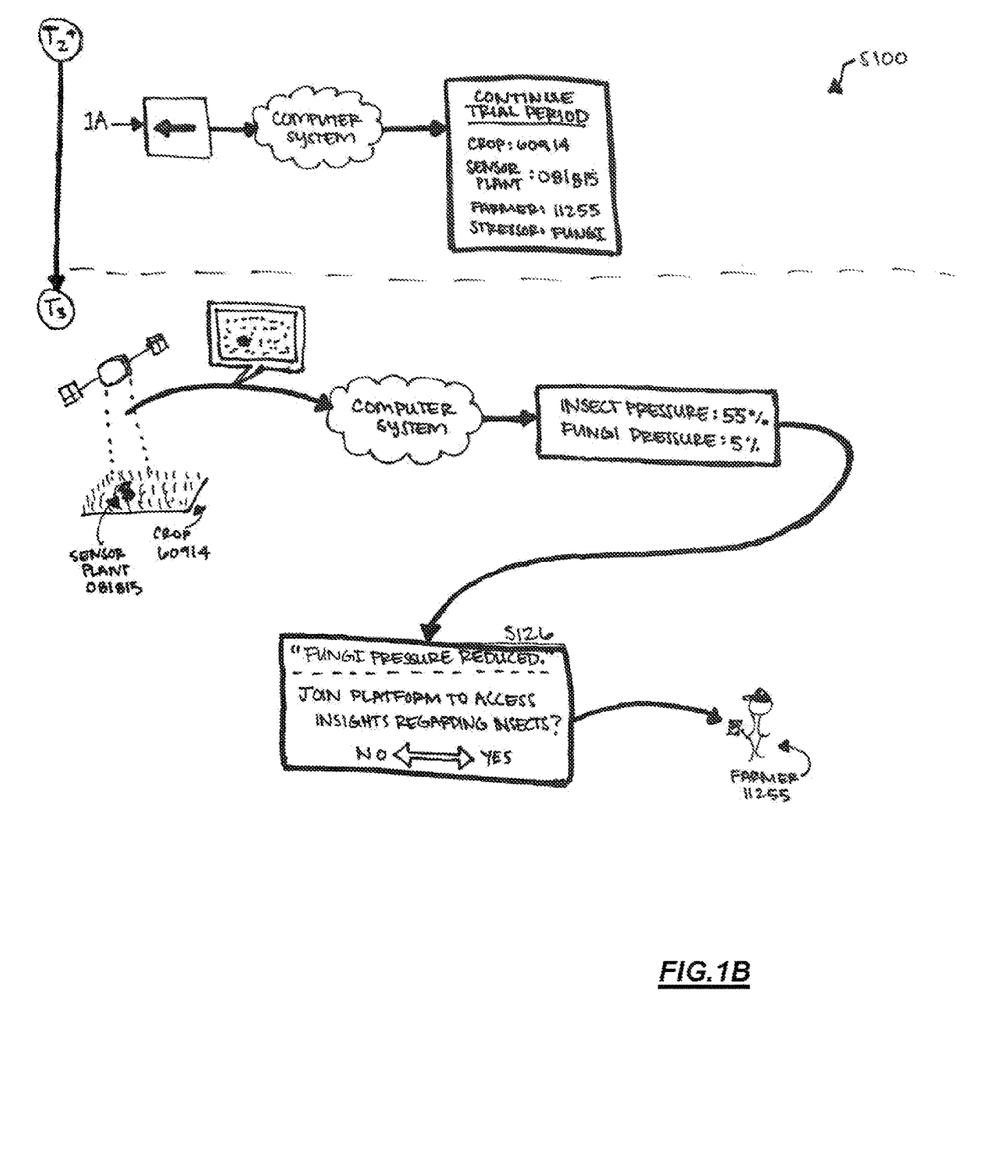

As shown in FIGS. 1A and 1B, a method S100 includes accessing a feed of images recorded at a set frequency by an aerial sensor in Block S110. The method S100 further includes, during an initial period: detecting a signal generated by a sensor plant in a subset of images in the feed of images in Block S112, the sensor plant configured to generate an optical signal indicating presence of a set of stressors; identifying a geographic location of the sensor plant based on the subset of images in Block S114; identifying a user associated with a crop located within a threshold distance of the geographic location in Block S116; and flagging the user for recruiting to join a sensor plant platform in Block S118.

The method S100 further includes, during a trial period succeeding the initial period: at a first time, in response to detecting a first pressure of a first stressor at the sensor plant, in the set of stressors, notifying the user of presence of the first stressor in the crop in Block S120; at a second time, in response to detecting a second pressure of the first stressor at the sensor plant, the second pressure exceeding a threshold pressure, identifying a first mitigation action, in a set of mitigation actions, predicted to reduce the second pressure of the first pressure in Block S122 and notifying the user of the second pressure of the first stressor and the first mitigation action in Block S124; and, at a third time, in response to detecting a first pressure of a second stressor, in the set of stressors, prompting the user to join the platform to gain access to information regarding the second stressor in the crop in Block S126.

2. Applications

Generally, Blocks of the method S100 can be executed by a computer system (e.g., a remote server, a local computing device, a computer network) in cooperation with a plant sensor platform (e.g., a native application or web-based application) to: detect signals generated by sensor plants; interpret (e.g., estimate) pressures of stressors at sensor plants based on the signals; distribute information regarding these pressures to users (e.g., farmers, agronomists, researchers) associated with crops proximal or containing these sensor plants; and suggest mitigation actions matched to these pressures of stressors and the crops associated with these sensor plants.

Generally, a sensor plant includes a promoter-reporter pair configured to detect stressors present in the sensor plant and to produce a detectable signal (e.g., in the electromagnetic spectrum) to indicate presence of these stressors in the sensor plant or in a region of a crop where the sensor plant is located more generally. In one implementation, the computer system can cooperate with the plant sensor platform (hereinafter "the system") to onboard a new user associated with a crop containing or proximal a set of sensor plants. In particular, the system can: access images (e.g., satellite or aerial color or infrared images) of agricultural fields; scan these images for signals indicative of sensor plants (e.g., fluorescence in a particular spectrum characteristic of the sensor plants or characteristic of a particular stressor present at the sensor plants); identify a population of sensor plants spread across various locations (e.g., around the world) depicted in these images based on such characteristic signals detected in these images; identify a population of users associated with crops containing or proximal these detected sensor plants; and flag the population of users for recruiting to join the plant sensor platform to gain access to insights (e.g., stressor presence and magnitude derived from optical plant characteristics) and suggestions regarding health of these crops.

In this implementation, to recruit a new user (e.g., in the flagged population of users) to join the platform, the system can initially enable the user to access or receive limited data—such as a subset of available data or lower-resolution data—derived from optical characteristics of sensor plants detected in or near an agricultural field associated with the user, such as during a trial period for this user. For example, the system can enable the user to elect to receive updates for a particular stressor—in a set of stressors detected and indicated by sensor plants detected in or near the user's crop—during the trial period. Then, during this trial period, the system can update the user regarding this particular stressor responsive to a particular trigger, such as: detection of an optical signal (e.g., fluorescence at or near a particular frequency) by sensor plants indicative of the particular stressor; detection of the optical signal at greater than a threshold amplitude (per sensor plant or sensor plant area detected), which indicates that a pressure from the particular stressor exceeds a threshold pressure; and/or detection of a change (e.g., growth or reduction) in the amplitude of the optical signal, which indicates a change in pressure magnitude of the particular stressor over time.

Furthermore, in response to detecting pressures of the particular stressor, the system can identify a mitigation action predicted to reduce or eradicate such a detected pressure and then transmit a notification suggesting this mitigation action to the user. The system can continue serving updates and/or mitigation action suggestions to the user over time (e.g., weekly, monthly) throughout the trial period. Additionally, during and/or after this trial period, the system can enable the user to gain or share insights with a network of users (e.g., farmers, agronomists, agricultural vendors) via the platform, such as by connecting (e.g., via the platform) the user to a particular vendor based on a suggested mitigation technique or by enabling user access to pressure data of crops proximal the user's crop. Therefore, throughout the trial period, the system can enable the user to: engage with the platform with minimal effort or barrier to entry; and gain actionable insights regarding the particular stressor, which may be particularly valuable and/or actionable for this user with this crop.

Once the user joins the platform, the system can continue to: access images of the crop over time (e.g., daily, weekly, biweekly); detect sensor plants in these images; and interpret pressures of stressors within the crop based on presence and/or amplitudes of signals present at these sensor plants.

Furthermore, the system can store stressor and/or sensor plant data derived from images of detected sensor plants in a crop profile linked to the user's crop. As the system captures and interprets additional sensor plant data over time, the system can update the crop profile for this crop. The user may then access this crop profile (e.g., via the native application) to track types and/or magnitudes of (likely) stressors in the crop.

The system can also collect additional information regarding the crop from the newly onboarded user, such as: a timeframe during which the crop was planted; a timeframe during which the crop will be harvested; frequency of irrigation; volume of irrigation; types of treatments typically applied to the crop; information regarding soil health; information regarding nutrients for the crop; etc. The system can similarly leverage this information to update the crop profile for this crop and to more accurately estimate and/or predict pressures of stressors for this crop. Thus, with this additional information, the system can estimate pressures for this crop with increased sensitivity and increased confidence, thereby enabling the user to be more confident in information provided by the system and gain additional and more-precise insights regarding health of the crop by joining the platform.

3. Sensor Plant

Generally, a sensor plant includes a promoter-reporter pair configured to detect stressors present in the sensor plant and to produce a detectable signal (e.g., in the electromagnetic spectrum) to indicate presence of these stressors in the sensor plant or in a region of a crop where the sensor plant is located more generally. More specifically, a sensor plant can be genetically engineered to include: a promoter gene sequence (hereinafter a "promoter") configured to activate in the presence of (e.g., "linked to") a particular stressor; and a reporter gene sequence (hereinafter a "reporter") paired to the promoter and configured to exhibit (or "express") a signal when the promoter is active.

In particular, a sensor plant can be genetically engineered to include promoter and reporter pairs that cooperate to indicate presence of stressors in the sensor plant. A promoter includes genetic regulatory elements that drive expression of mRNA at a specific time and place that is subsequently translated into a functional protein. Promoter activity is representative of native biological processes that occur when a particular stressor is present in the sensor plant. To detect presence of these stressors, a reporter that expresses a certain signal can be coupled to the promoter of choice. Therefore, when the sensor plant's cells express the promoter associated with a particular stressor, the reporter tagged to the promoter is also expressed and produces a detectable signal. For example, the sensor plant can be genetically engineered to fluoresce (i.e., absorb photons at one frequency and emit photons at a different frequency) in the presence of (and proportional to) a disease or stressor pressure. In this example, the sensor plant can be modified to fluoresce in the presence of one or more disease or stressor pressures, such as: fungi, bacteria, nematodes, parasites, viruses, insects, heat, water stress, disease, nutrient stress or deficiency, phytoplasmal disease, soil health, etc.

In one implementation, the sensor plant can be genetically engineered to include a particular promoter-reporter pair. For example, the sensor plant (or sensor plant seed) can initially be genetically engineered via genetic engineering techniques to associate bioluminescence of the sensor plant (initiated by a reporter) to a promoter linked to a particular metabolic process indicative of water stress in the sensor plant. Then, at a later time (e.g., once this sensor plant is planted and/or grown in a crop or other agricultural environment), in response to a water level in the sensor plant cells falling below a minimum water concentration, the sensor plant can: initiate the particular metabolic process, and therefore express the promoter; express the reporter and initiate a metabolic process linked to plant bioluminescence; and signal—via bioluminescence of the sensor plant—a water concentration below the minimum water concentration.

Therefore, in this implementation, the sensor plant can be configured to include a promoter-reporter pair configured to signal presence of particular biotic and/or abiotic pressures experienced by the sensor plant, such as pest, disease, water, heat, soil health, and/or nutrient stresses or deficiencies. For example, the sensor plant can be genetically engineered to include a promoter with activity linked to presence of one stressor at the plant, such as a fungal, pest, heat, water, disease, or nutrient stress. The sensor plant can also be genetically engineered to include a reporter paired with the promoter and configured to produce a detectable signal—such as an electromagnetic signal (e.g., fluorescent signal) in the visible light or infrared spectrum—when the corresponding promoter is activated. The promoter-reporter pair can be incorporated into the sensor plant via molecular binding and metabolic engineering techniques that associate expression of a promoter responsive to a particular biological stress with a reporter that produces a measurable signal when the promoter expresses. The promoter-reporter pair can be configured to produce a measurable signal by pairing the reporter with the promoter, such that when the promoter expresses, the reporter also expresses. Therefore, via expression of the reporter, the promoter-reporter pair can produce a measurable signal of a particular biological stress or trait in the sensor plant.

In another implementation, the sensor plant can be genetically engineered to include multiple promoter-reporter pairs, each promoter-reporter pair indicative of a particular biological process occurring in the sensor plant cells in response to a particular stressor. For example, the sensor plant can include: a first promoter-reporter pair including a first promoter representative of a first biological process linked to presence of a water stressor tagged to a red fluorescence protein reporter; and a second promoter-reporter pair including a second promoter representative of a second biological process linked to presence of a fungal stressor tagged to a yellow fluorescence protein reporter. Then, in response to presence of a fungal stressor in the sensor plant, the sensor plant can: initiate the second biological process, and therefore express the second promoter; express the yellow fluorescence protein reporter; and signal a fungal stressor magnitude above a threshold fungal stressor magnitude. Therefore, the sensor plant can signal presence of multiple stressors via genetic modification of the sensor plant cells to include a set of promoter-reporter pairs.

In one variation, the sensor plant can be genetically engineered to include a multiplexed gene sensing network representative of a set of combinatorial promoter-reporter pairs. The multiplexed gene sensing network includes multiple promoters tied to one or more reporters. The sensor plant can therefore include a set of promoters, each promoter in the set of promoters paired to a reporter in a set of reporters or a combination of these reporters. For example, the sensor plant can be genetically engineered to include: a first promoter paired to a red fluorescing reporter, the first promoter linked to a first biological process associated with a water stressor; a second promoter paired to a yellow fluorescing reporter, the second promoter linked to a second biological process associated with a fungal stressor; and a third promoter paired to both the red fluorescing reporter and the yellow fluorescing reporter, the third promoter linked to a third biological process associated with a heat stressor. In response to the plant cell exceeding a threshold temperature, the sensor plant can: initiate the third biological process, and therefore express the third promoter; express the red fluorescing reporter and the yellow fluorescing reporter; and signal presence of a heat stressor in the plant (e.g., sensor plant temperature above a threshold temperature).

Therefore, the sensor plant can be genetically engineered to include this multiplexed gene sensing network to leverage a set of reporters to detect expression of a set of promoters linked to particular biological processes that occur in the plant. Thus, the sensor plant can leverage a small number of reporters (e.g., fluorescing compounds) to monitor and detect a greater number of promoters and/or biological processes and therefore simplify the detection process by reducing the number of reporters required, as fluorescent compounds exhibit broad spectral features and may be difficult to simultaneously measure and distinguish between a large number of these fluorescent compounds.

4. Stressor Detection

The system can detect and interpret signals generated by sensor plants by extracting features from images of sensor plants that correlate to presence of particular stressors at the sensor plants. More specifically, the system can access digital images (e.g., spectral images) of a sensor plant(s) and/or plant canopy (e.g., sensor plants and surrounding plants) captured by an optical sensor (e.g., a multispectral or hyperspectral imaging device) to detect reporter signals and interpret stressors present in these sensor plants based on these reporter signals.

In particular, an optical device can record optical signals generated by the sensor plant (e.g., in the form of color or multispectral images); and the computer system can extract features (e.g., intensities at particular wavelengths) from these images, interpret presence and/or magnitude of a particular stressor exposed to the sensor plant based on these features, and interpolate or extrapolate health and environmental conditions at other plants nearby (e.g., non-sensor plants; other unimaged sensor plants) based on presence and/or magnitude of the stressor thus indicated by the sensor plant.

For example, the computer system can extract intensities of particular wavelengths corresponding to specific compounds (e.g., proteins) in the sensor plant and interpret a pressure of a particular stressor exposed to the sensor plant based on intensities of these wavelengths—such as based on a stored model linking plant stressors to wavelengths of interest based on known characteristics of promoter and reporter genes in the sensor plant—and before such stressors are visually discernible in the visible spectrum (i.e., with an unaided human eye). The computer system can also interpolate or extrapolate presence or magnitude of these stressors in other plants near this sensor plant to predict overall health of a crop or agricultural field.

The system can access images of sensor plants captured by an optical sensor, such as from a handheld camera, a handheld spectrometer, a mobile phone, a UAV, a satellite, or from any other device that includes a high-resolution spectrometer, includes band-specific filters, or is otherwise configured to detect wavelengths of electromagnetic radiation fluorescence, luminescence, or any other optical signal emitted by the sensor plant in the presence of a particular stressor.

More specifically, the system can: access hyperspectral images—of a leaf area of a sensor plant, a whole sensor plant, a group of like sensor plants, a whole crop of sensor plants, or many fields of sensor plants—recorded by a remote sensing system (e.g., in a handheld device, in a boom or pole installed in the field, in manned or unmanned field equipment, in an aircraft, or in a satellite); extract spectral characteristics for these hyperspectral images; and interpret presence and/or magnitude of a particular stressor(s) present at the sensor plant, group of plants, crop, or fields based on correlations between spectral characteristics extracted from these hyperspectral images and known characteristics (e.g., fluorescence) expressed by a particular promoter-reporter pair in this sensor plant.

5. Onboarding

The system can enable users to join a sensor plant data platform (hereinafter the "platform") to access actionable data extracted from signals generated by sensor plants and gain insights regarding health of crops associated with these users.

In one implementation, the system can onboard a new user to the platform responsive to the user purchasing a set of sensor plant seeds or seedlings. For example, when a user purchases a bag of sensor plant seeds, the system can: prompt the user to provide a set of contact information (e.g., email address, phone number); link this set of contact information to a SKU of the bag of sensor plant seeds purchased by the user; and automatically target this user for joining the platform. In another implementation, the system can onboard a new user to the platform responsive to a request by the user—such as a request by a farmer owning a crop located within a particular region including sensor plants. In yet another implementation, the system can onboard a new user to the system in response to detecting signals generated by a sensor plant located proximal or within a crop associated with this user.

5.1 Recruiting a New User

In one implementation, the system can actively recruit a new user (e.g., farmer, agronomist) associated with a particular crop—such as a crop including a sensor plant or within a region in which a sensor plant is located—to encourage this user to join the data platform. In this implementation, the system can: identify a user associated with a crop proximal or including a sensor plant; selectively serve limited and/or lower-resolution data obtained from this sensor plant to the user during a trial period for this user; and/or enable the user to join the platform to access additional and/or higher-resolution data obtained from this sensor plant.

5.1.1 Identifying Users

The system can leverage detection of signals generated by sensor plants—distributed throughout various geographic regions—to identify users (e.g., farmers, agronomists, crop managers) associated with crops containing or proximal sensor plants. The system can then selectively target these users for recruitment to the platform. For example, in response to identifying a soybean sensor plant in a soybean crop associated with a farmer, the computer system can: notify this farmer of the soybean sensor plant in the soybean crop; and provide a preview of viable information available to the user regarding the soybean crop if the user joins the platform.

In one implementation, the system can leverage aerial images, recorded by an optical sensor (e.g., installed on a satellite), to: detect optical signals generated by sensor plants; geolocate (e.g., via GPS) these sensor plants; and identify crops including or proximal these sensor plants. The system can selectively recruit users (e.g., crop owners, farmers, agronomists) associated with these crops to join the data platform.

For example, the system can access a feed of images captured by an optical sensor, such as from a satellite or any other aerial device. In response to detecting a signal generated by a sensor plant or set of sensor plants in a subset of images, in the feed of images, the system can: identify a particular region georeferenced by the subset of images capturing the signal generated by the sensor plant; identify a crop located within this particular region; access a set of contact information corresponding to a user (e.g., owner, farmer, agronomist) associated with the crop (e.g., parcel number, address, phone number, email address); generate a notification indicating presence of the sensor plant; and transmit the notification to the user.

In one implementation, the system can automatically notify the user of the sensor plant upon detecting the sensor plant and identifying the user. Alternatively, in another implementation, the system can be configured to delay notifying the user of the sensor plant until a pressure of a stressor—detectable by the sensor plant—exceeds a threshold pressure. In particular, in response to detecting presence of a sensor plant in a crop associated with a user, the system can: identify a user associated with the crop; flag this user for recruiting to join the platform; and contact this flagged user responsive to the pressure of the stressor exceeding the threshold pressure.

For example, at a first time, in response to detecting presence of a sensor plant in a particular crop, the system can: estimate a first magnitude of a particular stressor at the sensor plant; and, in response to the first magnitude of the particular stressor falling below a threshold magnitude, flag this crop for continued monitoring. Then, at a second time succeeding the first time (e.g., by two weeks, by one month), the system can estimate a second magnitude of the particular stressor at the sensor plant. In response to the second magnitude exceeding the threshold magnitude, the system can: access a set of contact information linked to this crop and associated with a user (or multiple users); generate a notification indicating presence of the stressor as signaled by the sensor plant present in the crop; and transmit the notification to the user (e.g., via text message, via email, via the native application).

Therefore, in this implementation, the system can leverage detected signals generated by a sensor plant to: identify a user (e.g., farmer) who may be a candidate for joining the data platform; and, by delaying notification of the data platform until after the pressure of the stressor has reached the pressure threshold, enable this user to immediately gain valuable and/or actionable insights regarding the current health (e.g., stressor presence or absence) of the user's crop.

5.1.2 Trial Period: Data Reporting

During a trial period—such as before the user elects to join the platform—the system can provide a series of status updates regarding the user's crop. The system can selectively serve these status updates to the user over time (e.g., throughout the trial period) to motivate the user to join the platform. In one implementation, the system can: provide the user with limited or low-resolution data regarding the user's crop; withhold more complete and/or high-resolution data regarding this crop; and prompt the user to join the platform to gain access to these additional data. For example, in response to detecting a signal from a sensor plant in a crop associated with a farmer, the system can: access a set of data (e.g., identity of stressors in the crop, magnitude of stressors in the crop) extracted from the signal in the crop; select a first subset of data, in the set of data, for serving to the user; serve the first subset of data to the farmer (e.g., via native application, via web application, via email); and prompt the farmer to "unlock" access to a second subset of data, in the set of data, by electing to join the platform.

In one implementation, the system can: identify a set of stressors detectable by the sensor plant; and, during the trial provide, enable the user to access information (e.g., pressure and/or stressor data) regarding a subset of stressors (e.g., one stressor), in the set of stressors. For example, in response to detecting a set of signals (e.g., a red fluorescent signal and a yellow fluorescent signal) generated by a sensor plant located within a crop associated with a user, the system can: identify a first stressor (e.g., fungi), in a set of stressors, linked to a first signal, in the set of signals; identify a second stressor (e.g., drought), in the set of stressors, linked to a second signal, in the set of signals; generate a notification indicating identification of the sensor plant, in the crop, configured to detect pressures of the first stressor and the second stressor; generate a prompt to select the first stressor or the second stressor for tracking during a trial period; and transmit the notification—including the prompt—to the user (e.g., via text message, via email, via native application). Then, in response to receiving selection of the first stressor from the user, the system can: store this selection of the first stressor in a crop profile for this crop; monitor pressures of the first stressor during the trial period; and serve information (e.g., pressure magnitude, stressor presence, suggestions for treating pressures of stressors) regarding pressures of the first stressor to the user during this trial period. Additionally, the system can enable the user to select to receive information regarding both the first stressor and the second stressor in exchange for joining the platform. Therefore, in this example, by prompting the user to select which she receives during this trial period, the system can encourage the user to both interact with the platform and select to receive information most relevant to or most valuable to this user or to this user's crop, thereby increasing a likelihood of the user receiving actionable information and/or immediately extracting value from this information and thus electing to join the platform.

In the preceding example, the system can similarly enable the user select to receive different types of information (e.g., different stressors, pressure magnitude and/or presence, frequency) once the user joins the platform. For example, in response to the user joining the platform, the system can prompt the user to select: a first level corresponding to receiving information regarding the first stressor and the second stressor; or a second level corresponding to receiving information regarding the first stressor, the second stressor, and a third stressor, in the set of stressors, and linked to a third signal, in the set of signals. In another example, the system can prompt the user to select: a first level corresponding to receiving information regarding the set of stressors on a biweekly basis; or a second level corresponding to receiving information regarding the set of stressors as soon as new information is available for this sensor plant.

In another example, in response to detecting a first signal (e.g., a pigmentation signal) generated by a sensor plant, the system can: identify a type of the sensor plant; identify a set of stressors linked to the type of the sensor plant, the sensor plant configured to detect stressors in the set of stressors; and, in response to the first signal corresponding to a first stressor, in the set of stressors, notify a user, associated with the crop, of detection of the first stressor in the crop. Furthermore, the system can enable the user to: select to continue receiving notifications and/or updates regarding the first stressor in the crop during the trial period; and/or to gain access to notifications and/or updates regarding each stressor, in the set of stressors, by joining the platform.

In another implementation, the system can provide the user with access to information regarding presence (e.g., binary data) of a particular stressor in the user's crop during the trial period. The system can then enable the user to unlock access to higher-resolution data regarding this particular stressor in the user's crop by joining the platform. For example, during a trial period for a farmer, in response to detecting a pressure of a first magnitude of a fungal stressor in the farmer's crop, the system can: inform the farmer (e.g., via the native application) of the presence of the fungal stressor in the crop, while withholding the first magnitude of the first pressure from the user. However, the system can prompt the user to join the platform (e.g., via purchase of a membership) to reveal the first magnitude of the pressure of the fungal stressor in the crop. Therefore, in this implementation, the system can gate access to information (e.g., data) of differing sensitivities based on whether the user joins the platform. More specifically, the system can enable the user to control sensitivity of data accessible to this user by enabling the user to select between receiving lower-sensitivity data without joining the platform or to gain access to higher-sensitivity data in exchange for joining the platform.

In one implementation, the system can selectively provide the user information regarding crop health only when a pressure (e.g., magnitude) of a particular stressor exceeds a threshold pressure. For example, the system can: access a feed of images of a sensor plant recorded (e.g., by a satellite) at a set frequency (e.g., biweekly); and extract features from images in the feed of images to interpret pressures of a particular stressor; and, at a first time, in response to detecting a first pressure (e.g., 10%) of the particular stressor less than a threshold pressure (e.g., 50%), withhold disclosure of the first pressure of the particular stressor from the farmer. Later, at a second time, in response to detecting a second pressure (e.g., 55%) of the particular stressor greater than the threshold pressure, the system can: generate a notification indicating presence of the second pressure of the particular stressor in the crop; and transmit the notification to the farmer. Additionally, the system can prompt the farmer to join the platform in order to receive additional prompts regarding this particular stressor (or other stressors) regardless of whether a pressure exceeds the threshold pressure, thereby enabling the farmer to intervene sooner (e.g., to mitigate the particular stressor in the crop) and/or see changes to this particular stressor within the crop over time in exchange for joining the platform.

Furthermore, in this implementation, the system can minimize errors in reporting presence and/or magnitudes of stressors in the user's crop by limiting notifications to pressures of stressors above the threshold pressure. In particular, because there may be limited data for the user's crop (e.g., during the trial period, before the user joins the platform), pressures (e.g., magnitudes) of stressors estimated by the system may be attributed to noise at relatively lower pressures. Therefore, by waiting to notify the user until the pressure exceeds this threshold pressure, the system can be more confident in this predicted pressure and/or presence of the particular stressor.

5.2 Crop Profile

The system can compile sensor plant data collected for a crop over time (e.g., during the trial period and/or after the user joins the platform) into a crop profile for the user associated with the crop. This crop profile can thus include information representing historical sensor plant data for this crop such as: types of stressors detected, pressures of stressors detected, changes in pressures of stressors detected over time, etc.

In one implementation, the system can host or interface with a user portal—executing on the user's computing device (e.g., a mobile device, a computer)—to configure a crop profile for the crop. For example, the user may download the native application to her smartphone and generate a new crop profile. The user may manually populate the new crop profile with various information, such as: name; contact information (e.g., phone number, email address, address); notification preferences; location of the crop; type(s) of crop grown (e.g., tomato, corn, grape); size of crop; etc.

In one variation, in response to the user joining the platform, the system can prompt the user to specify typical farming habits for this crop (e.g., timing of planting, quantity of seeds, timing of harvesting, irrigation frequency and volume, types and frequency of treatments applied). The system can then leverage this information provided by the user to: more accurately estimate detected pressures (e.g., presence and/or magnitude) of stressors in this particular crop (e.g., at relatively lower or higher pressure magnitudes); promptly inform the user of these stressors when detected; predict future pressures of stressors in this crop and inform the user of these predicted pressures in advance; and/or identify more effective mitigation techniques to suggest to the user responsive to detected or predicted pressures in this crop. Therefore, by collecting additional information specific to this crop once the user joins the platform, the system can enable the user to access data of increased sensitivity—which may increasingly valuable to the user over time—in exchange for joining the platform.

6. Monitoring Stressors Over Time

Once the user joins the platform, the system can continue monitoring sensor plant signals over time to continue detecting pressures of stressors within the crop, updating the crop profile, and/or suggesting mitigation actions to the user associated with the crop.

In one implementation, the system can detect a pressure of a particular stressor in a user's crop and transmit a notification (e.g., via text message, via native application) regarding this pressure to the user. In another implementation, the system can log a series of pressures of the particular stressor detected over a duration (e.g., 1 week, 1 month) and display the series of pressures in a list to the user at the end of the duration (e.g., via the user's computing device). Additionally, the system can identify trends regarding pressures of stressors in the user's crop and inform the user of these trends.

In particular, the system can identify patterns and/or trends in the detected sensor plant data over time (e.g., over a growing period). The system can then store these observed patterns and/or trends at the crop profile for this crop for predicting future pressures of stressors in the crop. For example, the system can record a timeseries of pressures of a particular stressor at set intervals (e.g., once per week, biweekly, once per month) over a growing season for a crop. The system can then identify patterns or behaviors associated with this particular stressor based on the timeseries of pressures and store these at the crop profile for this crop. Further, the system can record a timeseries of environmental data (e.g., average temperature, average rainfall, average humidity) and link this timeseries of environmental data with the corresponding timeseries of pressures of the particular stressor. The system can then leverage this timeseries data to derive correlations between pressures of the particular stressor in this crop and environmental data. Then, during the next growing season, the system can leverage these stored patterns and correlations associated with the particular stressor in this crop to predict pressures of this particular stressor prior to detection of these pressures. Furthermore, the system can preemptively suggest mitigation actions to the user to prevent pressures of this particular stressor based on these predictions.

In one implementation, the system can suggest planting of additional sensor plants in the crop—such as based on observed patterns or behaviors associated with this crop. For example, over time, the system can identify a recurring insect stressor in a particular crop. In this example, if the sensor plant is planted in a central location within the crop, a portion of the crop may already be infested by the time the sensor plant signals presence of the insect stressor. Therefore, the system can suggest that the user purchase a bag of sensor plant seeds (e.g., matched to this crop) to plant along an edge of the crop from which the insects typically enter the crop during the next growing season.

6.1 Local Detection

In one variation, the system can access images of the sensor plant recorded locally (e.g., at the sensor plant). In particular, the system can access images recorded by various fixed or mobile, local sensors, such as a fixed camera mounted to a pole in the crop (e.g., proximal the sensor plant), a smartphone or tablet, a sensor mounted to a truck or 4×4, a sensor mounted to a combine, and/or a sensor mounted to a drone or crop duster.

In one implementation, in response to the user joining the platform, the system can suggest to the user to install a local device proximal the sensor plant for capturing images of the sensor plant. For example, the system can prompt the user to select a type (e.g., fixed or mobile) of local sensor preferred by the user. In response to receiving selection of a fixed camera configured to be mounted to a pole installed proximal the sensor plant in the crop, the system can: ship the fixed camera (and any other equipment required for installation) to the user; and transmit instructions to the user for installation and setup of the fixed camera. Prior to shipping, the system can automatically link this fixed camera to the sensor plant in this user's crop, such that images captured by this camera are associated with sensor plant in this crop.

Therefore, in this variation, the computer system can combine high-resolution, short-interval time series representation of the health of this sensor plant with features extracted from low-frequency, wider field-of-view images of clusters of plants or a whole crop containing this sensor plant to predict the health of multiple or all plants in this crop.

7. Mitigation Actions

In one variation, the system can prompt the user to complete a mitigation action in response to detecting a pressure of a particular stressor in the user's crop. In this variation, the system can: detect a pressure of a particular stressor in the crop via examination of images of a sensor plant within the crop; select a mitigation action (e.g., spray crops with a volume of a particular pesticide) matched to the pressure of the particular stressor in this crop; and prompt the user (e.g., via the native application) to execute the mitigation action (e.g., within a particular timeframe, at a particular frequency). The system can suggest mitigation actions tailored to the crop based on information stored at the crop profile for this crop. The system can suggest different mitigation actions based on various crop factors such as type (e.g., insect, water, heat, fungi, nutrient) of stressor, intensity (e.g., pressure magnitude), timing (e.g., within the growing season), growth or reduction of pressures over time, etc.

In one implementation, the system can selectively suggest mitigation actions with varying sensitivity based on whether the user previously elected to join the platform. For example, at a first time during a trial period for a user, in response to detecting a first pressure of a fungal stressor in the user's crop, the system can prompt the user to apply a fungicide to a region of the crop containing or proximal the first pressure of the fungal stressor. Then, at a second time succeeding the trial period, once the user has joined the platform, in response to detecting a second pressure of the fungal stressor in the user's crop, the system can prompt the user to: apply a first volume of a first fungicide, in a set of fungicides, to a first subregion of the user's crop; and apply a second volume of the first fungicide to a second subregion of the user's crop.

Additionally, in this variation, the system can enable the user to interact with other users—such as other farmers, agronomists, or agricultural vendors (e.g., seed or plant vendors, crop treatment vendors)—via the platform. For example, the system can enable the user to: share a crop profile (e.g., of the user's crop) with other users (e.g., farmers) within a particular region in which the user's crop is located; access crop profiles and/or pressure data associated with crops within the particular region or within a region selected by the user; communicate (e.g., via the platform) with farmers, agronomists, or vendors regarding suggestions or treatments for the user's crop based on the crop profile or pressure data (e.g., historical or current) for the user's crop; and/or directly purchase products (e.g., within the platform) from vendors on the platform based on pressure data for the user's crop and/or based on mitigation techniques suggested to this user.

In one example, in response to detecting a pressure of a pest stressor within a set of sensor plants (e.g., a single sensor plant, a cluster of sensor plants, a crop of sensor plants) in the user's crop, the system can: select a first mitigation action (e.g., apply pesticide), in a set of mitigation actions, matched to the pressure of the pest stressor; identify a subset of vendors, in a set of vendors on the platform, matched to the first mitigation action (e.g., based on products sold by these vendors); prompt the user to execute the first mitigation action; and present the user (e.g., via the platform) with the subset of vendors. Additionally and/or alternatively, the system can isolate a particular subset of products (e.g., pesticides), in a set of products, offered by this subset of vendors and present the user with this subset of products. Further, in this example, the system can enable "chat windows" between users and vendors to further facilitate selection of products by the user and/or tailoring of product and/or treatment suggestions by these vendors for this user's crop.

8. User Feedback

The system can prompt the user to periodically confirm (e.g., via manual inspection or testing) detection of stressors within the crop. The system can then leverage this information received from the user to update the crop profile for this crop. For example, in response to detecting a pressure of a soil-related stressor at a sensor plant in the crop, the computer system can generate a prompt for the user to collect a soil sample proximal the sensor plant in the crop for additional testing. The user may then upload the results of testing of the soil sample (e.g., via native application) to the system. The system can then: confirm whether an actual pressure of the soil-related stressor—represented by the results of testing for this soil sample—match the detected pressure of the soil-related stressor; and store these actual and detected pressures at the crop profile for the crop. Later, when predicting a next pressure of the soil-related stressor at this sensor plant, the system can leverage information—such as the actual pressure linked to the detected pressure—stored in the crop profile to improve accuracy of estimating the next pressure of the soil-related stressor in this crop.

Similarly, the system can prompt the user to periodically confirm (e.g., via manual inspection or testing) effectiveness of mitigation actions suggested to the user for treating a detected pressure of a particular stressor. For example, in response to detecting a first pressure of an insect stressor in the user's crop, the system can prompt the user to perform a first mitigation action including applying a particular type of pesticide at a first frequency (e.g., daily) for a first duration (e.g., one week). At a start of the first duration, the system can prompt the user to upload a first image (e.g., captured via the user's mobile device) of the sensor plant depicting the first pressure of the insect stressor. Then, in response to expiration of the first duration, the system can prompt the user to upload a second image of the sensor plant. The system can then compare the two images to confirm that the first mitigation action is effective in reducing the first pressure of the first stressor. Furthermore, the system can identify whether the user should: stop application of the first mitigation action responsive to elimination of the first pressure; continue application of the first mitigation action responsive to reduction (e.g., below a threshold reduction) of the first pressure; stop application of the first mitigation action and instead begin application of a second mitigation action in replacement of the first mitigation action responsive to growth and/or minimal reduction of the first pressure.

In one variation, the system can similarly prompt the user to periodically input crop characteristics corresponding to instances of detected pressures of stressors. For example, in response to detecting a pressure (e.g., of a particular magnitude) of a water stressor (e.g., drought) above a threshold pressure—indicating a relatively low moisture content in plants in the crop—the system can prompt the user (e.g., via text message, via the native application) to input a set of crop characteristics related to the water stressor, such as: an amount (e.g., inches) of rainfall in a preceding period of time (e.g., within the previous week); a number of days since irrigation of this crop; a frequency of irrigation for this crop; etc. The system can store this feedback from the user at the crop profile for this crop. The system can then leverage this feedback to predict pressures of water stressors in the future in this crop and/or to suggest mitigation techniques associated with this pressure of the water stressor to the user.

9. Variation: Post-Harvest

In one variation, the system can continue monitoring sensor plant signals after harvest—such as during collection or storing for storage—to identify damaged or diseased plants for disposal and/or to prevent spreading of stressors from these damaged or diseased plants to other plants.

For example, a set of sensors can be installed above a conveyor belt at a crop collection facility. The set of sensors can be configured to capture images of plants (e.g., sensor plants and non-sensor plants) passing along the conveyer belt and upload these images to the system (e.g., via wireless connection). The system can then access these images to detect signals generated by sensor plants to identify pressures of stressors in plants in near real-time, such as before these plants are sorted and placed in storage with larger batches of crops. In particular, in this example, in response to detecting a pressure of a fungal stressor in a particular sensor plant, the system can alert an assembly line worker to remove this sensor plant and/or a particular subset of plants linked to this sensor plant for further examination prior to storing this particular subset of plants with a larger batch of plants. Additionally and/or alternatively, in this example, the system can trigger (e.g., via wireless communication) a sorting apparatus (e.g., an automatic rotating partition, a robotic arm) installed along the conveyer belt to automatically remove or separate this sensor plant and/or the particular subset of plants linked to this sensor plant from the larger batch of plants.

In another example, a set of sensors can be installed in a first container configured for storage of crops. The set of sensors can be configured to capture images of plants (e.g., sensor plants and non-sensor plants) stored within the first container. In this example, the set of sensors can be installed in a device flexibly coupled to a wall of the first container, such that the device can rotate an orientation of the device to capture images of different plants stored within the first container. Then, in response to detecting a pressure of an insect stressor in sensor plants in the first container, the system can: identify a mitigation action linked to the pressure of the insect stressor; and prompt a user associated with the first container to execute the mitigation action in plants in the first container. Further, the system can: access an identifier (e.g., based on a source of plants, a type of plants) corresponding to plants in the first container; identify a set of containers, including the first container, linked to the identifier; and alert a user associated with the container to inspect plants in the set of containers for the insect stressor and/or to execute the mitigation action in plants in the set of containers.

Therefore, by detecting pressures of stressors in sensor plants after harvesting of crops containing these sensor plants, the system can enable: prevention of spread of pressures of stressors to healthy plants during sorting of crops and/or while plants are in storage; identify sources of pressures of stressors in sensor plants in a sorting facility or in storage and thus locate other plants which may also be affected by these pressures; and manage pressures of stressors (e.g., via suggested mitigation techniques) detected in these sensor plants to reduce crop losses after harvest.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:
1. A method comprising:
accessing a feed of images recorded at a set frequency by an aerial sensor;
during an initial period:
   detecting a signal generated by a sensor plant in a subset of images in the feed of images, the sensor plant configured to generate an optical signal indicating presence of a set of stressors;
   identifying a geographic location of the sensor plant based on the subset of images;
   identifying a user associated with a crop located within a threshold distance of the geographic location; and
   flagging the user for recruiting to join a sensor plant platform; and
during a trial period succeeding the initial period:
   at a first time, in response to detecting a first pressure of a first stressor, in the set of stressors, at the sensor plant, notifying the user of presence of the first stressor in the crop;
   at a second time, in response to detecting a second pressure of the first stressor at the sensor plant, the second pressure exceeding a threshold pressure:
     identifying a first mitigation action, in a set of mitigation actions, predicted to reduce the second pressure of the first stressor; and
     notifying the user of the second pressure of the first stressor and the first mitigation action; and
   at a third time, in response to detecting a first pressure of a second stressor, in the set of stressors, prompting the user to join the sensor plant platform to gain access to information regarding the second stressor in the crop.

* * * * *